United States Patent [19]

Hsu

[11] Patent Number: 5,443,227
[45] Date of Patent: Aug. 22, 1995

[54] SWITCHING CONTROL FOR MULTIPLE FIBER-GUIDED MISSILE SYSTEMS

[75] Inventor: Hui-Pin Hsu, Northridge, Calif.

[73] Assignee: Hughes Aircraft Company, Los Angeles, Calif.

[21] Appl. No.: 136,190

[22] Filed: Oct. 15, 1993

[51] Int. Cl.⁶ .................... F41G 7/30; H04J 4/00; H04J 14/00; H04B 10/24
[52] U.S. Cl. .................... 244/3.12; 359/123; 359/137
[58] Field of Search ............. 244/3.12; 359/123, 135, 359/137, 139, 165; 370/50

[56] References Cited

U.S. PATENT DOCUMENTS 5,007,050  4/1991  Kasparian et al. ............ 359/123
5,311,344  5/1994  Bohn et al. ................. 359/123

OTHER PUBLICATIONS

"Implementation of a TDM Passive Optical Network for Subscriber Loop Applications," McGregor et al, Journal of Lightwave Tech., vol. 7, No. 11, Nov. 89.
"Lightwave Subcarrier CATV Transmission Systems," G. E. Bodeep and J. E. Darcie, IEEE Transactions on MTT, vol. 38, pp. 524–533, May 1990.

Primary Examiner—Ian J. Lobo
Attorney, Agent, or Firm—Charles D. Brown; Randall M. Heald; Wanda K. Denson-Low

[57] ABSTRACT

A fast and reliable switch (50) for multi-channel, bi-directional fiber optics data link (FODL) systems. The FODL channel switching is accomplished through a software command on the subcarrier frequency (SCF) code without using any moving components or wavelength sensitive optical devices. A fiber star coupler (92) and in-line erbium doped fiber amplifiers (94A-94Q) transform the FODL system into an electrically switchable, fiber star network with low optical power loss penalty. The switch can be used in multiple fiber optics guided missile launch systems and fiber optics based surveillance systems with multiple outposts. The switching scheme allows the launcher/controller (60) to perform a time-sharing control on multiple missiles (or outposts) (80-80P) by switching the SCF code sent to the programmable SCF generator of the OE unit in the controller (launcher). The scheme can also easily be extended to operate in a multiple control station mode that uses multiple control station at the launcher/controller (60) to control multiple missiles or outposts (80A-80P).

30 Claims, 3 Drawing Sheets

SWITCHING CONTROL FOR MULTIPLE FIBER-GUIDED MISSILE SYSTEMS

BACKGROUND OF THE INVENTION

The present invention relates to multi-channel, bi-directional fiber optics data link "(FODL") systems, and more particularly to an improved switch for such systems.

Conventional optical fiber switches rely on electro-mechanical switches to physically align different input and output fiber pairs for signal transmission. The small fiber core size makes precision alignment of these fiber pairs a challenge. The use of moving parts in the conventional fiber switch also raises reliability concerns especially under severe operation conditions, such as missile launch. Furthermore, a missile launcher (or surveillance system) with more than two missiles (or outposts) requires several 1×2 switches in cascade to cover all possible channel connections. This results in a complicated switch control and longer switch time.

Although an integrated optics, channel waveguide, electro-optic (EO) switch requires no moveable parts, its performance is sensitive to the optical wavelength and the insertion loss of fiber-to-channel-waveguide coupling. It is also difficult to provide switching for a bi-directional FODL system that uses two optical wavelengths for two-way transmission.

Another optical switch design uses acoustic-optics (AO) beam deflection to steer the connecting fiber channels This scheme again is sensitive to the signal optical wavelength and suffers high loss due to poor fiber-AO device-fiber coupling. "Modulation and switching of light in dielectric waveguides," J. M Hammer, p. 139, "Integrated Optics" edited by T. Tamir, Springer-Verlag, Berlin and New York, 1975.

It would therefore be advantageous to provide a multi-channel, bi-directional fiber optic data link system which does not require the-use of electro-mechanical, electro-optic or acoustic-optics switches for switching light signals.

SUMMARY OF THE INVENTION

This invention presents a faster and more reliable switch for multi-channel, bi-directional fiber optics data link (FODL) systems. The FODL channel switching is accomplished through a software command on the subcarrier frequency (SCF) code without using any moving components or wavelength sensitive optical devices. A fiber star coupler and in-line erbium doped fiber amplifiers (EDFA) transform the FODL system into an electrically switchable, fiber star network with low optical power loss penalty.

The switch is applicable, for example, to multiple fiber optics guided missile launch systems and fiber optics based surveillance systems with multiple outposts. The switching concept allows the launcher to perform a time-sharing control on multiple missiles (or outposts) by switching the SCF code sent to the Local Oscillator (LO) in the launcher/controller. The scheme can also easily be extended to operate in a multiple control station mode that uses multiple control stations at the launcher/controller to control multiple missiles or outposts. This switch is particularly suitable for a multi-channel, bi-directional FODL system that has an uplink command channel data rate significantly lower than its downlink channel. All uplink command channels which include the designated SCF codes for each remote platform are time division multiplexed (TDM) and continuously broadcast to all remote platforms via a fiber star network. The video/data/GPS downlink signal from remote platforms (missile or outpost) each occupies an un-overlapped subcarrier band with its subcarrier frequency defined by the received SCF code. By matching the SCF code for a designated remote platform and the SCF code for the LO at the downlink receiver, the video/data/GPS downlink transmission from any designated remote platform (missile or outpost) to the launcher can be accomplished. The channel switch controlled at the launcher can be as fast and agile as the SCF code change commanded by the launcher processor. It requires no moving parts and therefore is more reliable than conventional electro-mechanical and electro-optic fiber switches. The switching performance is also not sensitive to the wavelength of optical devices in the FODL system. The system cost can be reduced by keeping all switching control at the launcher and making all opto-electronics (OE) units at remote platforms identical to each other.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
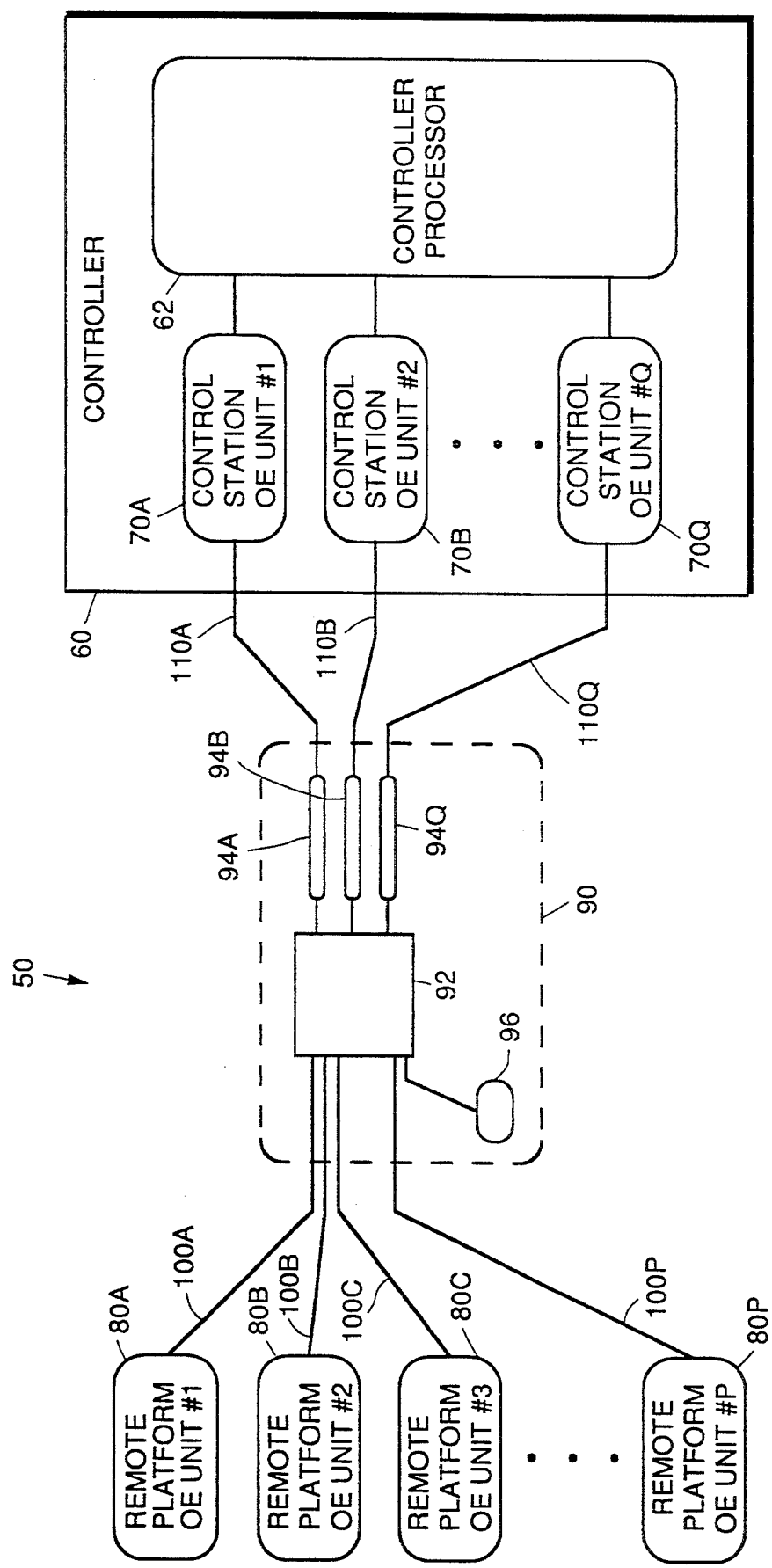
FIG. 1 illustrates in simplified schematic form a multi-channel FODL system embodying this invention.

A multi-channel FODL system 50 embodying the invention is shown in FIG. 1, with the FODL channel switching between Q (Q≧1) controller stations 70A–70Q and P (P>=2, P>Q) remote platforms 80A–80P. For a missile system, remote platforms" refers to the fiber guided missiles and "controller" refers to the missile launcher. For a surveillance system, "remote platforms" refers to the observation posts or antenna sites and "controller" refers to the center control station. This invention is particularly suitable for a multi-channel FODL system that has an uplink command channel data rate significantly lower than its downlink channel.

The FODL system 50 operates with a Time Division Multiplexed (TDM) uplink and SubCarrier Modulation (SCM) downlinks of FODL channels, both operating in a broadcasting mode via a fiber star network as shown in FIG. 1. All fiber channels, P channels from remote platforms 80A–80P (missiles or outposts) and Q channels from control stations 70A–70Q in a controller 60, respectively, are connected to fiber coupler optical circuit 90 comprising a (P+1)×Q fiber star coupler 92 to form the fiber star network. Fiber star couplers suitable for the purpose are commercially available. For example, Gould Inc. (Glen Burnie, Md.), markets a 32×32 star coupler; Aster (Hopkinton, Mass.), markets a model STS 8×8 star coupler; and E-Tek Dynamics Inc. (San Jose, Calif.), markets star couplers under the designations MMTC 0404 (32×32 star) and MMTC 0104 (1×32 star). The star coupler 92 combines all P (or Q) incoming optical signals and then splits the signal to feed all Q (or P) fiber output ports. In-line erbium doped fiber amplifiers (EDFAs) 94A-94Q spliced into the input/output I/O ports of the fiber star coupler 92, if needed, can compensate for the optical signal losses incurred by the fiber star network configuration. These EDFAs 94A-94Q can share a pump diode laser 96 which injects its pump power through an auxiliary I/O port of fiber star coupler 92 and amplifies optical signals passing through the EDFAs 94A-94Q. Thus, the fiber coupler optical circuit 90 comprises a signal distribution means for distributing optical signals from any of P inputs among all Q outputs and a signal amplification means for optically amplifying the optical signals carried on the uplink and downlink channels.

Although several control station OE units 70A-70Q are shown in FIG. 1, it will be appreciated that the invention may be advantageously employed even where Q=1, i.e. where there is a single control station.

The relatively low data rate of the command uplink channel (e.g., <1 MB/s), i.e., the link for communicating from the controller 60 to the remote platforms 80A-80P, allows all (P) uplink channels to be time-division-multiplexed together into a single higher data rate signal with no significant impact on the uplink transmitter and receiver design. The switching scheme requires a subcarrier frequency (SCF) code be added to the uplink command for each remote platform. The fiber star network broadcasts the TDM uplink signal continuously to all remote platforms. Once the SCF code is received by the uplink receiver 170 of the remote platform unit as shown in FIG. 2, the programmable SCF generator 180 can then generate the designated SCF from the VCO 188 to up-convert the video/data/GPS signal of the remote platform for downlink transmission to the control station.

Figure 2:
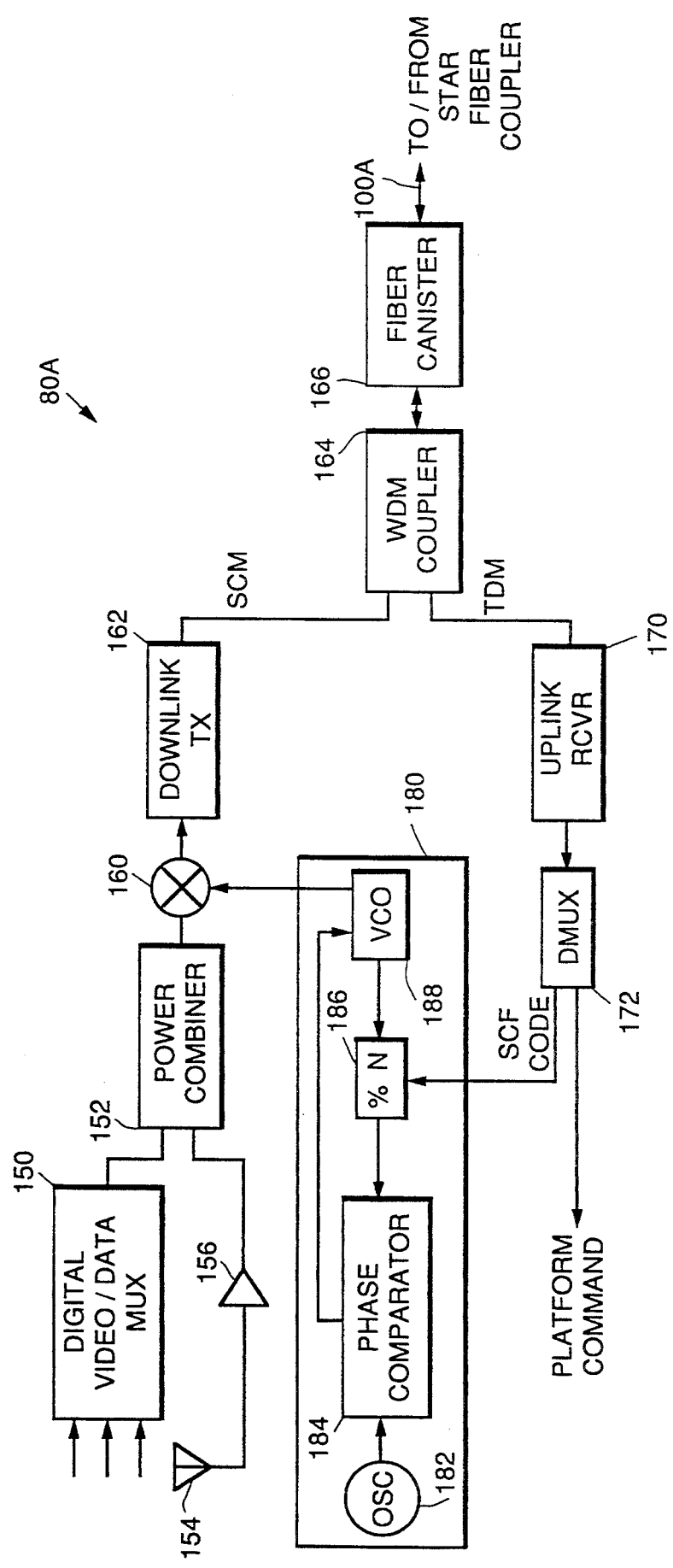
FIG. 2 illustrates a remote platform comprising the FODL system of FIG. 1.

FIG. 2 is a schematic diagram of an exemplary remote platform OE unit 80A. The unit has the capability of receiving data from a variety of sources including telemetry data and digitized video from a missile seeker or surveillance camera, which are fed to a multiplexer 150 to form a serial digital data stream containing both the telemetry and digitized video data. The unit is also capable of receiving global positioning system (GPS) microwave signals from satellites via an antenna 154 and pre-amplifier module 156. The multiplexed digital data from the multiplexer 150 and the GPS signal are combined by a power combiner 152 and then up-converted in frequency by a mixer 160 using the subcarrier signal from the programmable SCF generator 180. This subcarrier modulated (SCM) downlink signal is then converted into an optical signal by a downlink transmitter 162 for fiber transmission. SCM systems per se are know in the art; see, e.g., G. E. Bodeep and J. E. Carcie, "Lightwave Subcarrier CATV Transmission Systems," IEEE Transactions on MTT, Vol. 38, pp 524-533, May 1990. This downlink signal is then passed through a wavelength division multiplexing (WDM) coupler 164, optical fiber on the fiber canister 166, and sent to the star fiber coupler 92 via optical fiber link 100A. The coupler 164 performs the function of separating the uplink and downlink signals due to the differences in wavelength. One exemplary embodiment uses 1510 nm for the uplink channels and 1550 nm for the downlink channels.

Uplink signals from the star coupler 92 are detected and converted into an electrical signal at the uplink receiver 170 in the remote platform OE unit 80A. The received signals are passed through a demultiplexer 172, which separates the SCF code and the command for the intended remote platform. The SCF code is sent to the programmable SCF generator 180 to generate subcarrier frequency for the up-conversion of the video/data/GPS downlink signal. The commands will be used to command remote platform operation.

The programmable SCF generator 180 comprises an oscillator 182 whose output drives a phase locked loop comprising a phase comparator 184, a divide-by-N circuit 186 whose value of N is set by the SCF code from the demultiplexer 172. The divide-by-N circuit 186 divides the subcarrier frequency generated by the VCO 188 by a factor of N and phase locks it to the output signal from the oscillator 182. Another VCO output is the subcarrier frequency source, which is coupled to the mixer 160, to upconvert the video/data/GPS signal into the subcarrier frequency band for the downlink transmission.

Figure 3:
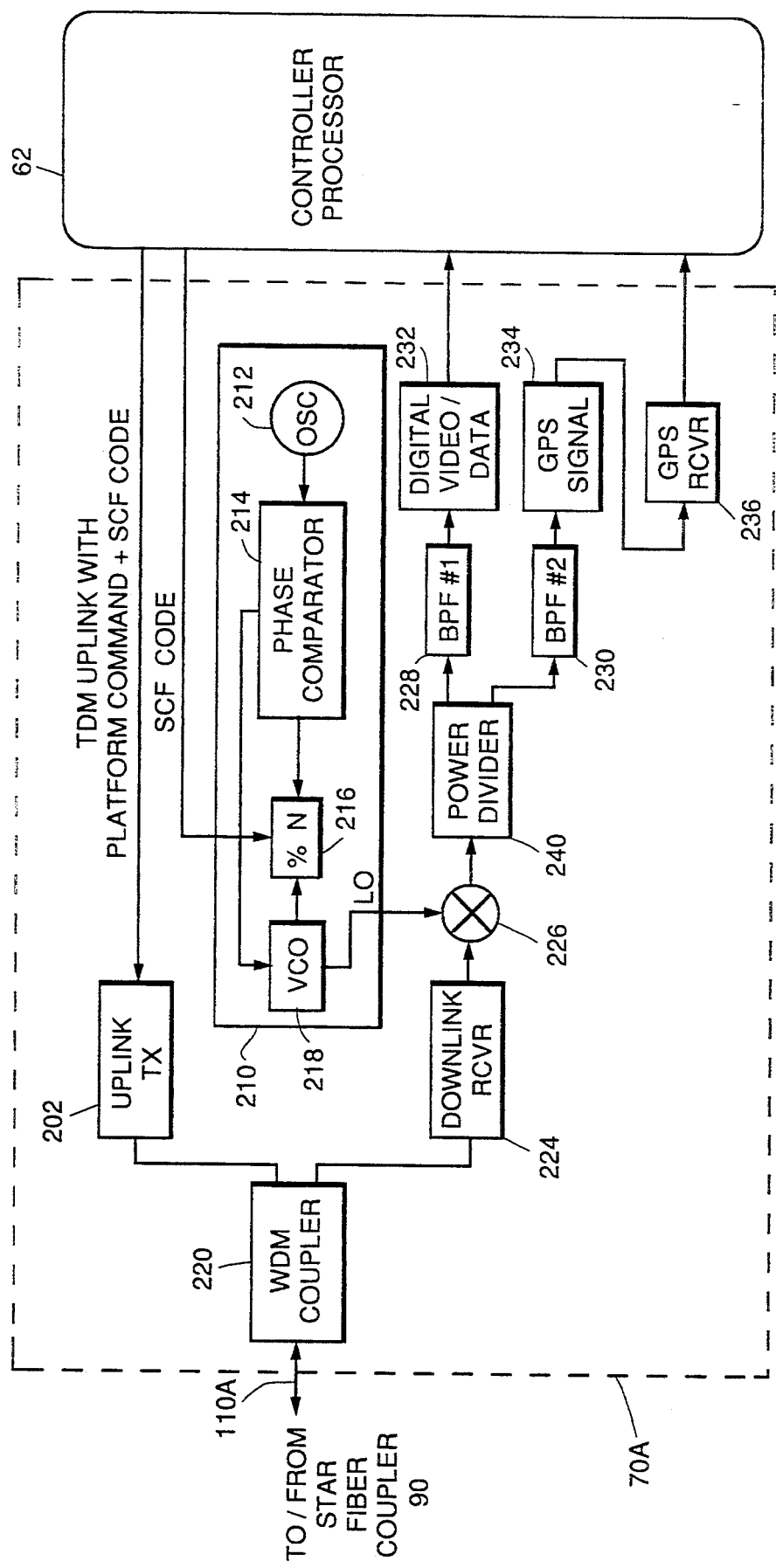
FIG. 3 illustrates a control station comprising the FODL system of FIG. 1.

The actual FODL channel switching takes place in the control station OE units 70A-70Q of the controller 60. FIG. 3 illustrates an exemplary control station OE unit 70A in further detail. The unit includes an uplink transmitter 202, which receives the TDM platform command with SCF codes from the controller processor 62, and generates the uplink transmitted signal which is passed through a WDM coupler 220 to the star coupler 92 via optical fiber 110A. The downlink signal is received by the downlink receiver 224 from the WDM coupler 220. The receiver output signal is mixed at mixer 226 with a local oscillator (LO) signal from a programmable SCF generator 210 to down-convert the sub-carrier modulated (SCM) video/data/GPS downlink signal from the subcarrier band to the baseband for further processing. The down-converted mixer output signal is then divided by a power divider 240, and sent to two bandpass filters 228 and 230, which separates the digital/video baseband data from the GPS signal. The digital video/data signals output from bandpass filter 228 are processed by controller processor 62 to recover the video and data from the remote platform. The GPS signal is processed by a GPS receiver 236, and the processed GPS signal is sent to the processor 62 in digital data format.

The SCM optical signals from all (P) remote platforms 80A-80P are combined and then split by the fiber star coupler 92. The combined optical signal now resembles a Frequency Division Multiplexed (FDM) signal with each individual SCM channel from different remote platforms occupying a subcarrier frequency band, designated by the SCF codes, in the frequency spectrum. A photodetector comprising the downlink receiver 224 then detects and amplifies this SCM-FDM optical signal from the fiber star coupler 92. The channel switching among the downlink channels from the remote platforms can be accomplished through a software command on the SCF code sent from the controller processor 62 to the programmable SCF generator 210. The SCF generator 210 generates an LO with frequency matching the subcarrier frequency of the specific remote platform downlink channel. Mixer 226, which performs electrical hetrodyne detection by mixing the LO to the received SCM/FDM signal, can only down-convert the downlink channel with matched SCF to the baseband for recovering the video/data/GPS signal. Band pass filters 228 and 230 can then be used to filter out the digital video/data and the GPS signal from the intended remote platform for further controller processing.

The programmable SCF generator 210 has identical design as the programmable SCF generator 180 in the remote platform OE unit 80A shown in FIG. 2. Generator 210 comprises an oscillator 212, a phase comparator 214, a divide-by-N circuit 216, and a VCO 218. The N value of the divide-by-N circuit 216 is selected by the SCF code provided by the controller processor 62.

The exemplary implementations of the programmable SCF generators shown in FIGS. 2 and 3 uses a frequency divider to phase lock a Voltage Controlled Oscillator (VCO) against a lower frequency reference crystal oscillator. The SCF generated by the VCO is determined by the frequency of the reference oscillator and the divisor N specified by the SCF code. The SCF can be assigned in close spectral spacing with adequate spectral guard bands to prevent inter-channel interference. In practice, the selection of the SCF must consider the bandwidth of the downlink video/data/GPS signals, the oscillator/PLL hardware bandwidth and the intermodulation among the SCM/FDM channels. For a multi-pod missile launcher, the number of SCF codes can be conserved by assigning the SCF codes to activated missiles only and the SCF codes can be re-assigned once the missile mission is completed.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A multi-channel, bi-directional fiber optic data link (FODL) system, comprising Q uplink fiber optic channels, P downlink fiber optic channels, a fiber optic star coupler for coupling said Q uplink fiber optic channels and said P downlink channels, P remote platform opto-electronic (OE) units respectively connected to said P downlink fiber optic channels, Q control station OE units respectively connected to said Q uplink channels, and a controller for providing remote platform commands addressed to said remote platform OE units for communication over said uplink channels in a time division multiplexed (TDM) scheme, said commands comprising a subcarrier frequency (SCF) code specifying a subcarrier frequency to be utilized by a particular remote platform OE unit to which said command is addressed, said remote platform OE units comprising programmable means responsive to said commands for generating an upconversion subcarrier signal at a subcarrier frequency determined by said SCF code to up-convert remote platform data for downlink transmission to said controller.

2. The FODL system of claim 1 wherein said uplink channels have an uplink data rate, said downlink channels have a downlink data rate, and wherein said downlink data rate is substantially higher than said uplink data rate.

3. The FODL system of claim 1 wherein each of said Q control station OE units respectively comprises a downlink receiver responsive to downlink signals received from said star coupler for providing receiver signals, means for generating a local oscillator (LO) signal, said means responsive to a corresponding SCF code to select said LO signal in dependence on said SCF code from said controller, and mixing means for mixing said receiver signals with said LO signal to down-convert said receiver signals.

4. The FODL system of claim 3 wherein each said control station OE units has associated therewith a different SCF code.

5. The FODL system of claim 3 wherein said means for generating said LO signal comprises a programmable SCF generator comprising an oscillator driving a phase locked loop comprising a phase comparator, a divide-by-N circuit whose value of N is set by said SCF code, and a voltage controlled oscillator whose output is said LO signal.

6. The FODL system of claim 1 wherein said star coupler comprises signal amplification means for optically amplifying said uplink and downlink signals.

7. The FODL system of claim 6 wherein said amplification means comprises a diode laser pump which injects its power through an auxiliary input port of said fiber star coupler, and a plurality of optical fiber amplifiers sharing said laser pump.

8. The FODL system of claim 1 wherein each of said remote platform OE units comprises an uplink receiver for recovering said time division multiplexed commands and SCF codes, and means for providing said recovered SCF codes to said means for generating said upconversion subcarrier signal.

9. The FODL system of claim 8 wherein said means for generating said upconversion subcarrier signal comprises a programmable SCF generator comprising an oscillator driving a phase locked loop comprising a phase comparator, a divide-by-N circuit whose value of N is set by said SCF code, and a voltage controlled oscillator whose output is said upconversion subcarrier signal.

10. The FODL system of claim 1 wherein said remote platform unit further comprises means for mixing said upconversion subcarrier signal with said platform data to provide a subcarrier modulated signal.

11. The FODL system of claim 10 wherein said remote platform unit further comprises a downlink transmitter responsive to said subcarrier modulated signal.

12. The FODL system of claim 1 further comprising a data multiplexer for combining signals from a plurality of platform data sources to form a serial digital data stream.

13. The FODL system of claim 1 wherein said platform data comprises global position system data signals.

14. The FODL system of claim 1 wherein said platform data comprises digitized video data.

15. The FODL system of claim 1 wherein said platform data comprises telemetry data.

16. A missile system comprising:
P fiber guided missiles;
a missile launcher controller for controlling said missiles; and
a multi-channel, bi-directional fiber optic data link (FODL) system, comprising:
Q uplink fiber optic channels;
P downlink fiber optic channels;
a fiber optic star coupler for coupling said Q uplink fiber optic channels and said P downlink channels;
P missile opto-electronic (OE) units respectively connected to said P downlink fiber optic channels;
Q launcher control station OE units respectively connected to said Q uplink channels; and a controller for providing remote platform commands addressed to said missile opto-electronic (OE) units for communication over said uplink channels in a time division multiplexed scheme, said commands comprising a subcarrier frequency (SCF) code specifying a subcarrier frequency to be utilized by a particular missile OE unit to which said command is addressed, said missile OE units comprising programmable means responsive to said commands for generating an upconversion subcarrier signal at a subcarrier frequency determined by said SCF code to upconvert remote platform data for downlink transmission to said launcher controller.

17. The missile system of claim 16 wherein said uplink channels have an uplink data rate, said downlink channels have a downlink data rate, and wherein said downlink data rate is substantially higher than said uplink data rate.

18. The missile system of claim 16 said Q control station OE units respectively comprises a downlink receiver responsive to downlink signals received from said star coupler for providing receiver signals, means for generating a local oscillator (LO) signal, said means responsive to a corresponding SCF code to select said LO signal in dependence on said SCF code, and mixing means for mixing said receiver signals with said LO signals to down-convert said receiver signals.

19. The missile system of claim 18 wherein each said control station OE units has associated therewith a different SCF code.

20. The missile system of claim 18 wherein said means for generating said LO signal comprises a programmable SCF generator comprising an oscillator driving a phase locked loop comprising a phase comparator, a divide-by-N circuit whose value of N is set by said SCF code, and a voltage controlled oscillator whose output is said LO signal.

21. The missile system of claim 16 wherein said star coupler comprises signal distribution means for distributing optical signals from any of P channels among all Q channels, and signal amplification means for optically amplifying optical signals carried on said uplink and downlink optical channels.

22. The missile system of claim 21 wherein said amplification means comprises a diode laser pump which injects its power through an auxiliary input port of said coupler, and a plurality of optical fiber amplifiers sharing said laser pump.

23. The missile system of claim 16 wherein said missile OE units each comprise an uplink receiver for recovering said commands, and means for providing said recovered SCF commands to said means for generating said upconversion subcarrier signal.

24. The missile system of claim 23 wherein said means for generating said upconversion subcarrier signal comprises a programmable SCF generator comprising an oscillator driving a phase locked loop comprising a phase comparator, a divide-by-N circuit whose value of N is set by said SCF code, and a voltage controlled oscillator whose output is said upconversion subcarrier signal.

25. The missile system of claim 16 wherein said remote platform unit further comprises means for mixing said upconversion subcarrier signal with said platform data to provide a subcarrier modulated signal.

26. The missile system of claim 24 wherein said remote platform unit further comprises a downlink optical transmitter responsive to said subcarrier modulated signal.

27. The missile system of claim 16 further comprising a data multiplexer for combining signals from a plurality of platform data sources to form a serial digital data stream.

28. The missile system of claim 16 wherein said platform data comprises global position system data signals.

29. The missile system of claim 16 wherein said platform data comprises digitized video data.

30. The missile system of claim 16 wherein said platform data comprises telemetry data.

* * * * *